…

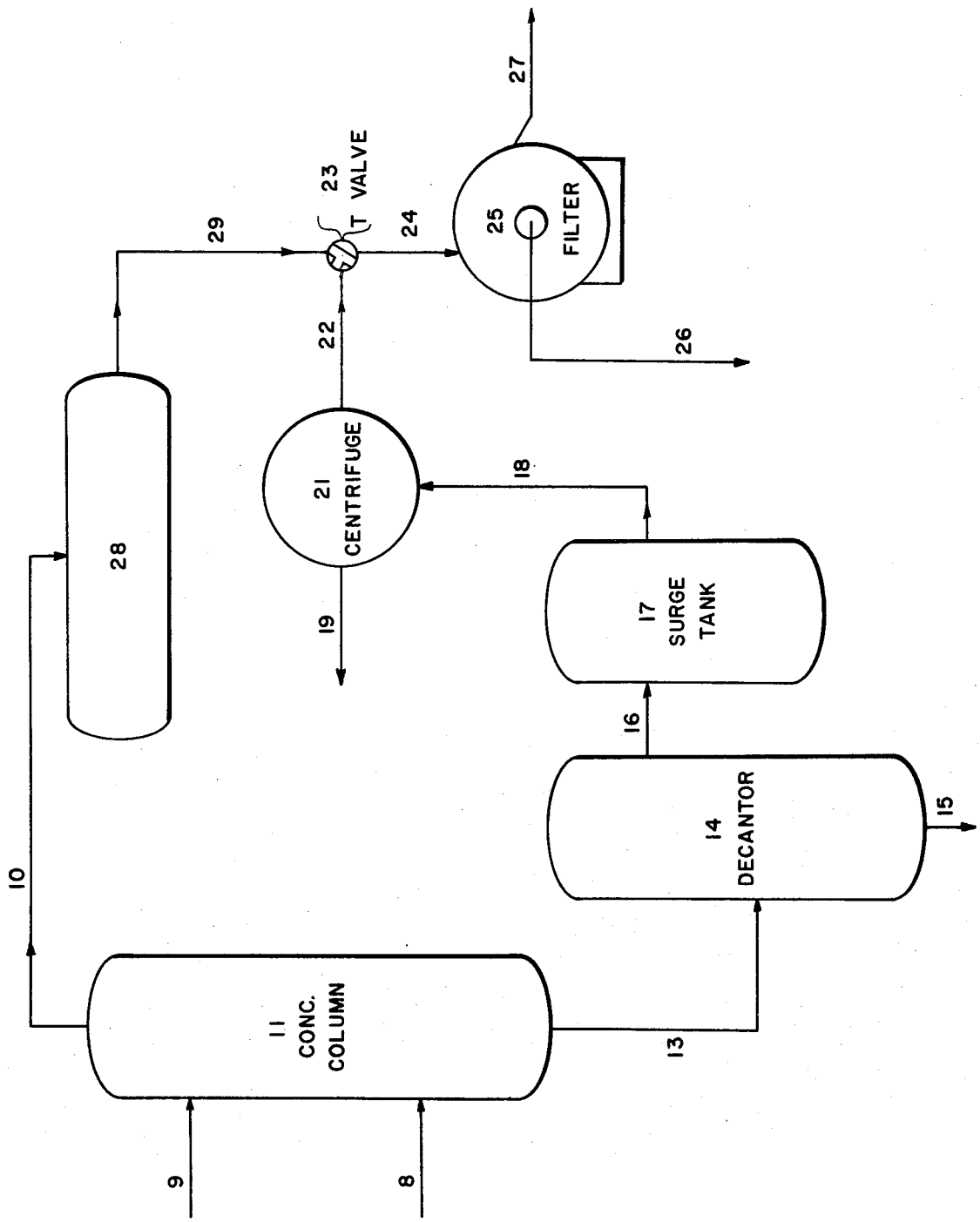

United States Patent Office 3,705,885
Patented Dec. 12, 1972

3,705,885
PROCESS FOR THE RECOVERY OF ESSENTIALLY PURE AMORPHOUS POLYOLEFINS
Elmer J. Hollstein, Wilmington, Del., and Lewis W. Hall, Jr., Chadds Ford, Pa., assignors to Standard Oil Company, Chicago, Ill.
Continuation-in-part of applications Ser. No. 558,495, June 17, 1966, and Ser. No. 703,831, Jan. 16, 1968. This application Dec. 2, 1969, Ser. No. 881,601
Int. Cl. C08f $15/00, 3/02, 1/94$
U.S. Cl. 260—93.7   1 Claim

ABSTRACT OF THE DISCLOSURE

A process for the separation of alpha-olefin polymers having different steric structures which comprises adjusting the concentration of a solution of amorphous polymer containing in suspension stereo-regular crystalline polymer and semicrystalline stereoblock polymer to 10–40 weight percent of polymer, centrifuging and recovering a substantially pure stereoregular polymer, and a solution of amorphous polymer containing in suspension stereoblock polymer, adjusting, if necessary, the concentration of the latter solution to 5–15 weight percent polymer, filtering the solution to recover substantially pure stereoblock polymer, and a filtrate containing amorphous polymer, and recovering substantially pure amorphous polymer from the filtrate.

CROSS-REFERENCE TO RELATED APPLICATIONS

This application is a continuation-in-part of our copending application Ser. No. 558,495, filed June 17, 1966, now abandoned, and of our application Ser. No. 703,831, filed Jan. 16, 1968.

BRIEF SUMMARY OF THE INVENTION

This invention relates to a novel process for fractionating polymers. This invention particularly relates to a novel process for effecting a clean separation of its components from a mixture of amorphous, stereoblock, and crystalline alpha-olefin polymers. In one aspect this invention particularly relates to a process of recovering a substantially amorphous fraction of an alpha-olefin polymer from a mixture of amorphous, stereoblock, and crystalline polymers preferably utilizing one or more $C_5$ to $C_7$ saturated hydrocarbons as the fractionating solvent.

BACKGROUND OF THE INVENTION

It has recently been discovered that alpha-olefins having a maximum of 8 carbon atoms per molecule and no branching nearer the double bond than the 4-position can be polymerized to solid and semi-solid polymers at temperatures and pressures which are relatively low as compared with conventional processes for polymerizing such olefins. Such polymerization is sometimes carried out by first admixing and at least partially dissolving the olefins in a non-polymerizable solvent and by carrying out the polymerization in the presence of a catalyst.

The non-polymerizable solvents normally used in low pressure alpha-olefin polymerization methods are generally $C_5$ to $C_{10}$ saturated cyclic or acyclic hydrocarbons. Examples of these solvents include n-pentane, isopentane, neopentane, n-hexane, isohexanes, cyclohexane, heptanes, octanes, nonanes, decanes, and homologues and mixtures thereof. The preferred solvents include pentanes, hexanes, heptanes, and mixtures thereof.

Low pressure polymerization and copolymerization of alpha-olefins and diolefins with catalyst systems made up of a partially reduced, heavy, transition metal halide and a reducing metal-containing compound to high density, often crystalline, high molecular weight, solid relatively linear polymer products has been assuming ever increasing importance and is now well known. This process is described in the literature, e.g., see Belgian Pat. 538,782. The alpha-olefinic feeds utilized in this type of polymerization and copolymerization include $C_2$–$C_8$, e.g., ethylene, propylene, butene-1, hexene-1, and mixtures thereof, with ethylene and propylene preferred.

In the process the polymers are prepared by polymerizing the constituent monomers in the desired proportions with the aid of certain polymerization catalysts, e.g., see above-mentioned Belgian patent. The catalysts are solid, insoluble, reaction products obtained by partially reducing a reducible, heavy, transition halide of a Group IVb or VIb or VIII metal with a reducing Group I and III metal-containing material such as an organometallic compound of an alkali, alkaline earth, rare earth metal or zinc. They can also be advantageously prepared by reducing an appropriate metal compound with the aid of metallic aluminum or a mixture of aluminum and titanium, etc. A catalyst of this type can thus be prepared, for example, by reducing 1 mole of titanium tetrahalide, usually tetrachloride, to the corresponding trivalent or subtrivalent titanium halide with about 0.2 to 6 moles of aluminum triethyl, triisobutyl or other aluminum alkyl compound of the formula RR'AlX. In this formula, R, R', and X can comprise alkyl groups and which can alternatively be hydrogen or a halogen, notably chlorine. The reducing is carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen, and sulfur impurities. The resulting precipitate in conjunction with some free aluminum alkyl compound is generally considered to constitute the actual active polymerization catalyst. Other organic and metallo-organic coordinators such as tetra ethoxysilane or the dimethyl ethers of polyethylene glycol can also be added to form the coordinated complex catalysts usable for alpha-olefin polymerizations. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of inert hydrocarbon solvents. The hydrocarbon solvents that have been shown to be particularly useful for this purpose and particularly for propylene polymerizations include hexane and heptane.

The polymerization is conveniently effected at temperatures of about 50° to 100° C. and pressures ranging from about 0 to 500 p.s.i.g., usually 0 to 100 p.s.i.g. The catalyst concentration in the polymerization zone is preferably in the range of about 0.01 to 0.5 weight percent based on total liquid and the polymer product concentration in the polymerization zone is preferably kept between about 5 to 15 weight percent based on total contents so as to allow easy handling of the polymerized mixture. The proper polymer concentration can be obtained by having enough of the inert diluent present or by controlling the polymerization short of 100% conversion.

When the desired degree of polymerization has been reached, a $C_1$ to $C_3$ alkanol such as methyl alcohol, ethanol, or isopropyl alcohol is normally added to the reaction mixture for the purpose of deactivating and partially dissolving the catalyst. However, other methods of catalyst deactivation well known to those skilled in the art can alternately be used.

Typical alpha-olefin polymerization products obtained from the above-disclosed methods are normally mixtures of polymers with varying molecular structures and varying molecular weights which can be fractionated by solvents, the solvent-separated fractions being polymers of different structures and different molecular weights. In the polymerization process using an inert hydrocarbon polymerization medium such as pentane, hexane, or heptane, the product obtained will be generally in a slurry form and is normally partially soluble in the polymerization medium.

Generally in commercial practice the insoluble polymer product is recovered from the solvent containing the dissolved polymer fractions by centrifuging the slurry. The recovered solid polymer product is often subsequently washed with alcohol and dried to yield a white powdery high molecular weight, highly crystalline polymer product. This polymer fraction is normally referred to as the crystalline fraction and has a density of from about 0.90 to 0.92.

In general, it has been found that the liquid recovered from the centrifugation step contains three polymer types according to molecular structure, namely, crystalline which is defined above which has been carried over in part due to non-perfect centrifugation; amorphous polypropylene which is defined as a polymer of a non-stereoregular structure, which polymer is not crystallizable and which is completely soluble in the solvent; and stereoblock polymer which has been described as a generally linear alpha-olefin polymer having crystallizable segments of stereoregular structure and non-crystallizable segments of irregular structure in the same molecule. This latter polymer is initially soluble in the solvent, but on standing it tends to crystallize and come out of solution. When crystallized, this polymer has a density in the range of from about 0.84 to about 0.87.

For the purposes of the present invention the polymer contained in the liquid fraction recovered from the initial centrifugation will be referred to, for convenience, as the atactic fraction, even though it contains in suspension polymers other than atactic.

Particularly useful in the process of the present invention are the atactic fractions of polyethylene, polypropylene, and propylene-ethylene copolymers. The term propylene-ethylene copolymer is used to designate a copolymer product in which the major proportion of polymer product is polymerized propylene and a minor proportion of the polymer product is polymerized ethylene. In general a propylene-ethylene copolymer contains 90 to 99 weight percent polymerized propylene and 1 to 10 weight percent polymerized ethylene as measured by infrared analysis.

The atactic polymer recovered from an alpha-olefin polymerization process as described above has been proposed as an additive in petroleum oil compositions, coating or laminating wax compositions, as well as many other general commercial applications. However, it has been discovered that if the entire polymer from atactic fraction of alpha-olefin polymer per se such as by steam stripping is added in substantial quantities to various compositions, it is relatively incompatible with many other organic compounds, particularly waxes and petroleum oils, due to the presence of crystalline polymer. Specifically, in the process of blending an atactic fraction with wax or oil, high temperatures are normally necessary to maintain a homogeneous blend of the polymer and the other components. For example, if a hot atactic fraction-wax blend is permitted to cool, fractions of the atactic fraction begin to precipitate causing what is known in the art as flocculation. The floc-containing composition then becomes unattractive for coating or other purposes because of process difficulties often experienced. Therefore, in order to use blends containing atactic fraction in any large quantities it is necessary to maintain the blend at a high temperature. If low temperature conditions are required such as in certain coating procedures, only a small amount of atactic fraction is then permissible in the blend if the undesirable flocculation is to be avoided. This limitation, of course, restricts the use of such blends to the point that they are often no longer commercially attractive. Also, the act of cooling hot melt blends containing substantial amounts of atactic fraction usually results in separation of the polymer from the other components of the blend, thereby resulting in a heterogeneous composition which is often unusable for its intended purpose or results in an inferior product. This problem has now been overcome.

DESCRIPTION OF THE INVENTION

It has now been discovered that by the process of the present invention a substantially pure amorphous alpha-olefin polymer can be recovered from the atactic fraction recovered from the stereospecific polymerization of alpha-olefins.

It has been discovered that by the process of the present invention the atactic fraction of the stereospecific low pressure polymerization of alpha-olefins can be purified to the extent that it contains only those polymer fractions which are found to be substantially completely miscible with waxes and oils and other organic compositions.

It has been further discovered that a substantially pure stereoblock polymer can be recovered from the atactic fraction according to the present invention.

It is therefore an object of this invention to provide a novel process for the recovery of a substantially pure atactic alpha-olefin polymer, together with a substantially pure stereoblock polymer, and a substantially pure crystalline polymer from the atactic fraction.

It is another object of this invention to provide a method of recovering a substantially pure amorphous fraction of atactic alpha-olefin polymer utilizing only the polymerization solvent as a separation medium.

It has now been discovered that the crystalline and stereo-block polymer fractions which are normally present in atactic fractions synthesized by methods utilizing low pressure techniques with stereospecific catalyst compositions, can be separated from the atactic fraction, leaving a substantially pure atactic polymer.

It has further been discovered that by subjecting atactic fractions dissolved in a $C_5$-$C_{10}$ hydrocarbon polymerization solvent to the specific steps of the process of the present invention, the amorphous polymer in the atactic fraction can be recovered substantially free of the crystalline and stereoblock polymers. It has also further been discovered that this substantially pure amorphous polymer recovered by the process of this invention is totally miscible and compatible with other organic compounds with which the unpurified amorphous fraction is relatively incompatible.

In the process of the present invention the use of foreign liquids is substantially avoided. Only the polymerization solvent which forms a part of the polymer-solvent solution to be separated is required. Therefore, the costly, time-consuming and complicated solvent fractionation towers necessary with the methods of the prior art are unnecessary and can be excluded with practicing the process of the present invention.

Briefly, the present invention comprises a process for the recovery of substantially pure amorphous alpha-olefin polymer from a hydrocarbon containing in solution atactic polymer recovered from the low pressure stereospecific polymerization of alpha-olefins. This solution normally contains hydrocarbon soluble amorphous polymer and small amounts of stereoblock and crystalline alpha-olefin polymers which are present as a suspension. The process of the present invention generally comprises (a) adjusting a dilute solution of atactic alpha-olefin polymer and hydrocarbon solvent as by distilling off solvent to a concentration in the range of 10 to 40 weight percent polymer in solution; (b) cooling the concentrated solution to a temperature in the range of 15° to 30° C. and centrifuging the cooled solution to recover a filtrate substantially free of crystalline polymer; (c) adjusting, if necessary, the centrifuge filtrate with hydrocarbon solvent to a polymer-in-solvent concentration in the range of 5 to 15 weight percent polymer; and (d) filtering the resulting dilute centrifuge filtrate and recovering a solvent-amorphous alpha-olefin polymer solution substantially free of stereoblock polymer and recovering from the last-mentioned solution a substantially pure amorphous alpha-olefin polymer.

A more complete understanding of the invention will be obtained from a consideration of the accompanying drawing which is a diagrammatic illustration of the process of the invention and in which certain valves, motors, and other control and operational means commonly employed by those skilled in the art are not illustrated in order to preserve the maximum of simplicity in the presentation.

Referring to the drawing, a dilute solution of atactic alpha-olefin polymer in polymerization solvent also containing small amounts of crystalline polymer and stereoblock polymer in suspension is transferred into concentration column 11 through line 9. Again, by the term atactic is meant the polymerization solvent-soluble fraction of low pressure stereospecific polymerizations as previously described. Also as previously stated, the inert polymerization solvents normally used in stereospecific low pressure methods are selected from $C_5$–$C_{10}$ saturated hydrocarbons. The preferred polymerization solvents are $C_5$–$C_7$ saturated hydrocarbons.

By a dilute solution is meant a solution of polymer in solvent which contains a polymer concentration in the range of 0.1 to 10 percent by weight. Concentrating column 11 can be a steam jacketed autoclave providing for external indirect heat application to the column contents or it can be a simple column fitted with a direct steam contacting inlet means such as is illustrated at point 8 in the drawing. The polymer-solvent solution in column 11 is concentrated to a polymer concentration in the range of 10 to 40 weight percent polymer in solvent solution by means of external heat application to the external part of vessel 11 such as providing steam to the steam jacket, or by directly contacting the solution with steam. Concentration of the solution is achieved by distilling off solvent from the solution in column 11 which solvent is transferred through line 10 to vessel 28 wherein the solvent is condensed and stored for use as will be later described.

The temperature in concentrating column 11 during the concentration step can be any temperature at which the hydrocarbon solvent can be efficiently distilled at the desired step. However, it is preferably maintained in the range of 35° to 75° C. This temperature can be regulated according to the solids content desired and/or the space velocity rate of the solution in the vessel, as well as by the quantity of heat applied to the column.

The concentrated solution is transferred from vessel 11 to decanter vessel 14 by way of line 13.

Decanter 14 is provided with a heat exchange means whereby the polymer-solvent concentrate can be cooled to a temperature in the range of 15 to 40° C. and wherein also separation of entrained water from the polymer-solvent concentrate is effected.

The spent water precipitated from the concentrate solution can be removed from decanter 14 via line 15 and discarded. The substantially water-free polymer-solvent solution concentrate is transferred out of decanter 14 to surge tank 17 by way of line 16 and subsequently to centrifuge 21 by way of line 18.

Substantially all of the crystalline polymer is separated from the polymer concentrate solution by centrifuge 21. The crystalline polymer is removed from centrifuge 21 through line 19 from which it can be further processed to recover a dry powdery polymer product. The polymer-solvent concentrate, now substantially free of crystalline polymer is transferred to precoat filter 25 via line 22 which contains T valve 23. The polymer-solvent concentrate (recovered from centrifuge 21) is diluted at T valve 23 to the desired concentration in the range of 5 to 15 weight percent polymer in solvent with solvent withdrawn from vessel 28 through line 29. A dilute polymer-solvent solution comprising substantially pure amorphous alpha-olefin polymer in hydrocarbon solvent is recovered as the filtrate from filter 25, by way of line 26. The substantially pure amorphous polymer can be subsequently recovered by flash evaporation, steam stripping, or many of the other well known means of solvent removal. The filter residue comprised substantially of stereoblock alpha-olefin polymer which is picked up on the drum of filter 25 is removed via line 27 from which it can be dried and recovered as a polymer product.

EXAMPLE I

A 50-gallon steam jacketed autoclave having an agitator for mixing disposed therein was charged with 25 gallons of n-hexane containing 22 p.p.m. of hydrogen and having dispersed therein particles of a catalyst mixture comprising a ratio of 2 moles of diethyl aluminum chloride to one mole of titanium trichloride to 0.02 mole of the dimethylether of diethylene glycol (diglyme). The catalyst mixture was prepared in the concentration of 0.002 lb. of titanium trichloride per pound of n-hexane. The charged autoclave was subsequently continuously agitated and maintained at 71° C. and pressured up to 100 p.s.i.g. with propylene monomer whereby polymerization of the propylene monomer to substantially crystalline high molecular weight polymer was effected. Propylene polymerization was continued until 30.0 lbs. of propylene monomer had been fed to the autoclave.

The monomer feed was then discontinued and the reaction killed by introducing two gallons of methanol in the hot reaction mixture. The hexane-insoluble polymer (crystalline fraction) was then separated from the hexane-soluble polymer (atactic fraction) by means of a centrifuge. An atactic fraction solution of 1.8 weight percent polymer solids in hexane solution was recovered from the reaction slurry. An analysis of this atactic fraction according to the procedures disclosed by Natta et al. in La Chemica e L'Industria 39, No. 4, 278–283 (1957) indicated this atactic fraction to contain 11.4 weight percent crystalline polymer; 20.3 weight percent stereoblock polymer and 68.3 weight percent amorphous polymer.

This atactic polymer-solvent solution was processed in the following manner to recover a substantially pure amorphous polymer fraction. The polymer-solvent solution was concentrated by means of dry heat application according to the process of the present invention as disclosed above to a concentration of 10 weight percent polymer solids in solvent solution. The concentrated solution was subsequently cooled to approximately 25° C. and centrifuged to produce separate liquid and solids fractions. The liquids fraction was subsequently filtered. The filtrate recovered from the filtering step, containing polymer in solvent, was subsequently subject to flash evaporation whereby a solid polymer residue was recovered. The solid polymer residue upon analysis was defined to contain greater than 99 weight percent amorphous polypropylene having only trace amounts of stereoblock and/or crystalline polymer contaminants.

EXAMPLE II

An atactic fraction of polypropylene in hexane was recovered from a stereospecific polymerization process identical to that disclosed in Example I. Analysis of this example disclosed that the atactic solution recovered from the crystalline polymer slurry contained 3.4 weight percent total polymer. This atactic fraction upon analysis was defined to contain 54.8 weight percent crystalline polypropylene; 0.6 weight percent stereoblock polypropylene and 44.6 weight percent amorphous polypropylene.

This polymer-solvent solution was processed in the identical manner as the polymer-solvent solution in Example I with the exception that in the concentration step, the hexane solvent was distilled from the solution by injecting steam directly into the solution, until the polymer concentration in the solution was 25 percent by weight. After removal of the crystalline fraction by centrifuging, the hexane contained 11.3 percent solids. The product recovered by this method was analyzed and found to contain 99 percent by weight amorphous polymer.

EXAMPLE III

A sample of atactic polypropylene in hexane solution identical to the sample of Example I was processed in the identical manner as Example I with the exception that the concentration step in Example I wherein the polymer-solvent solution was concentrated to a 10 weight percent polymer in solvent was omitted. Otherwise, the process was the same. Analysis of the polymer-solvent solution recovered from the filtrate step revealed that only about half of the crystalline polymer in the original product had been removed, and only about 10 weight percent of the stereoblock polymer had been removed thereby resulting in an amorphous alpha-olefin polymer product which was substantially impure. Thus as illustrated it is essential that all of the steps of the present process be followed substantially as disclosed so that all the advantages of the present invention are realized.

The method of the present invention is adaptable to either a batch or continuous process. The filter 25 as illustrated in the drawing can be a precoat rotating drum type filter well known to those skilled in the art. All of the well known filter aids normally comprised of diatomaceous earth particles and generally known to those skilled in the art can be used to improve the efficiency of that part of the process.

The process of the present invention can be conducted at atmospheric pressure or at subatmospheric or superatmospheric pressures according to the most suitable means available. Atmospheric pressure is the preferred condition.

As a further advantage of the present invention, the stereoblock fraction of atactic alpha-olefin polymer, as well as the crystalline polymer fraction, can be recovered separately providing usable polymer products which can be reblended with the crystalline polymer powder or used as individual polymeric additives for which there are many known applications, e.g. as a plasticizer in a polymeric or resinous coating composition.

It should be emphasized also at this point that one other important processing advantage realized in the practice of the method of this invention is the fact that no substantial quantities of foreign liquids are introduced into the polymer processing system. Many other methods of fractionating polymers, of course, are well known. For example, extraction of the polymer with ethers or other selective solvents for amorphous polymer fractions. The use of anti-solvent coagulants such as low-boiling ketones, alcohols, or other polar organic liquids are well known as means of fractionating alpha-olefin polymers. However, each of these procedures involves the addition of large amounts of liquids other than the polymerization solvent to the processing stream. Before the polymerization solvent can be recycled to the polymerization vessel, which is normally the practice in commercial processes, all of these foreign liquids must be removed. As has been previously described, the catalyst systems known to polymerize alpha-olefins are extremely sensitive to polar and/or oxygen-containing compounds. Therefore, expensive and time-consuming solvent recovery systems are necessary when foreign liquids are used to fractionate or recover the soluble polymer from the polymerization solvent if that solvent is to be re-used.

Reasonable variations and modifications are possible within the scope of the present invention, the essence of which is the process of separating and recovering amorphous, crystalline, and stereoblock alpha-olefine polymer fractions from the atactic fraction of an alpha-olefin polymer.

We claim:
1. A process for separating a mixture of amorphous polypropylene, stereoblock polypropylene, and crystalline polypropylene into its respective components in substantially pure condition which comprises
  (a) centrifuging at a temperature of from 15° to 30° C. a reaction product consisting of solvent, a major quantity of crystalline polypropylene insoluble in the solvent, a minor quantity of amorphous polypropylene soluble in the solvent, and a minor quantity of stereoblock polypropylene having a density less than the crystalline polypropylene,
  (b) recovering from the centrifuge substantially pure crystalline polypropylene and solvent containing amorphous polypropylene in solution in an amount less than 5 weight percent together with a minor quantity of stereoblock polypropylene in suspension therein,
  (c) concentrating the solution to a concentration of from 5 to 15 weight percent amorphous polypropylene,
  (d) subjecting the solution to filtration and recovering a substantially pure stereoblock polypropylene and a filtrate containing amorphous polypropylene in solution, and
  (e) recovering substantially pure amorphous polypropylene from the solution.

References Cited

UNITED STATES PATENTS

| | | | |
|---|---|---|---|
| 3,175,999 | 3/1965 | Natta et al. | 260—93.7 |
| 3,272,787 | 9/1966 | Scoggin et al. | 260—93.7 |
| 3,296,240 | 1/1967 | MacDonald et al. | 260—93.7 |
| 3,398,129 | 8/1968 | Leibson et al. | 260—93.7 |

JAMES A. SEIDLECK, Primary Examiner

R. A. GAITHER, Assistant Examiner

U.S. Cl. X.R.

260—88.2 S, 94.9 F, 878 B